(12) United States Patent
Ishida

(10) Patent No.: US 6,408,840 B2
(45) Date of Patent: Jun. 25, 2002

(54) METHOD AND APPARATUS FOR CUTTING A RARE EARTH ALLOY

(75) Inventor: Hazime Ishida, Takatsuki (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 09/734,050

(22) Filed: Dec. 12, 2000

(30) Foreign Application Priority Data

Dec. 14, 1999 (JP) .......................... 11-354882
Dec. 28, 1999 (JP) .......................... 11-372991

(51) Int. Cl.$^7$ ................................ B28D 1/06
(52) U.S. Cl. ...................... 125/21; 125/16.01
(58) Field of Search ................ 125/16.01, 16.02, 125/21

(56) References Cited

U.S. PATENT DOCUMENTS

| | | | |
|---|---|---|---|
| 3,400,494 A | * 9/1968 | Seitz | .......... 125/21 X |
| 4,457,851 A | 7/1984 | Tabaru et al. | |
| 4,770,723 A | 9/1988 | Sagawa et al. | |
| 4,792,368 A | 12/1988 | Sagawa et al. | |
| 5,201,305 A | 4/1993 | Takeuchi | |
| 5,575,189 A | 11/1996 | Kiuchi et al. | |
| 5,759,391 A | 6/1998 | Stadtmuller | |
| 5,810,643 A | * 9/1998 | Toyama | .......... 125/21 X |
| 5,827,113 A | * 10/1998 | Okuno et al. | .... 125/16.01 X |
| 5,834,663 A | 11/1998 | Fukuno et al. | |
| 5,896,851 A | 4/1999 | Katamachi et al. | |
| 5,907,988 A | 6/1999 | Kiuchi et al. | |
| 5,910,203 A | 6/1999 | Hauser | |
| 5,937,844 A | 8/1999 | Kiuchi et al. | |
| 6,006,738 A | 12/1999 | Itoh et al. | |
| 6,045,629 A | 4/2000 | Hasegawa et al. | |
| 6,065,461 A | 5/2000 | Asakawa et al. | |
| 6,143,193 A | 11/2000 | Akioka et al. | |
| 6,161,533 A | 12/2000 | Katsumata et al. | |

FOREIGN PATENT DOCUMENTS

| | | |
|---|---|---|
| JP | 63-23962 | 7/1988 |
| JP | 63-260756 | 10/1988 |
| JP | 01-248504 | 10/1989 |
| JP | 02-19460 | 2/1990 |
| JP | 02-131858 | 5/1990 |
| JP | 02-74160 | 6/1990 |
| JP | 04-216897 | 8/1992 |
| JP | 05-023966 | 2/1993 |
| JP | 05-96461 | 4/1993 |
| JP | 05-169434 | 7/1993 |
| JP | 05-220732 | 8/1993 |
| JP | 05-068609 | 9/1993 |
| JP | 05-258947 | 10/1993 |
| JP | 06-8234 | 1/1994 |
| JP | 06-71195 | 3/1994 |
| JP | 07-106288 | 4/1995 |

(List continued on next page.)

OTHER PUBLICATIONS

Notice of Reasons of Rejection, Reference No. SS00059B, Mailing No. 214779, Mailing Date: Jul. 18, 2001.
Notice of Reasons of Rejection, with full English translation, Reference No. SS00059B, Mailing Date: Oct. 24, 2001, Patent Application No. 2000–362705.

(List continued on next page.)

Primary Examiner—Joseph J. Hail, III
Assistant Examiner—Anthony Ojini
(74) Attorney, Agent, or Firm—Jeffrey L. Costellia; Nixon Peabody LLP

(57) ABSTRACT

A method for cutting a rare earth alloy of this invention includes cutting an object to be machined while supplying slurry containing dispersed abrasive grains between a wire and the object to be machined. The wire is driven with a drive member, at least a wire contact face of the drive member being composed of an organic polymer material. Cutting is carried out while a tension in a range between 14.7 N and 39.2 N is applied to the wire.

25 Claims, 12 Drawing Sheets

FOREIGN PATENT DOCUMENTS

| | | |
|---|---|---|
| JP | 07-195358 | 8/1995 |
| JP | 08-007272 | 1/1996 |
| JP | 08-57847 | 3/1996 |
| JP | 08-57848 | 3/1996 |
| JP | 08-243920 | 9/1996 |
| JP | 08-295875 | 11/1996 |
| JP | 09-070821 | 3/1997 |
| JP | 09-109014 | 4/1997 |
| JP | 09-168971 | 6/1997 |
| JP | 09-272122 | 10/1997 |
| JP | 09-290361 | 11/1997 |
| JP | 10-34011 | 2/1998 |
| JP | 10-86143 | 4/1998 |
| JP | 10-180750 | 7/1998 |
| JP | 10-296719 | 11/1998 |
| JP | 10-306275 | 11/1998 |
| JP | 10-324889 | 12/1998 |
| JP | 11-019862 | 1/1999 |
| JP | 11-277394 | 10/1999 |
| JP | 11-309674 | 11/1999 |

OTHER PUBLICATIONS

Specifications and Drawings for application Ser. No. 09/234,102, "Method for Cutting Rare Earth Alloy, Method for Manufacturing Rare Earth Alloy Plates and Method for Manufacturing Rare Earth Alloy Magnets Using Wire Saw, and Voice Coil Motor" Filing Date: Jan. 19, 1999, C. Masanori et al.

Specifications and Drawings for application Ser. No. 09/918,534, "Method for Cutting Rare Earth Alloy, Method for Manufacturing Rare Earth Alloy Plates and Method for Manufacturing Rare Alloy Magnets Using Wire Saw, and Voice Coil Motor" Filing Date: Aug. 1, 2001, C. Masanori et al.

* cited by examiner

METHOD AND APPARATUS FOR CUTTING A RARE EARTH ALLOY

BACKGROUND OF THE INVENTION

The present invention relates to respective methods for cutting a rare earth alloy, manufacturing rare earth alloy plates, and manufacturing rare earth magnets with a wire saw, and also relates to a voice coil motor including the rare earth magnet.

Conventionally, a technique of cutting an ingot of silicon with a wire saw to slice the ingot into a large number of wafers has been developed. Japanese Laid-Open Publication No. 6-8234, for example, discloses this technique. In accordance with this technique, a large number of wafers, each having a constant thickness, can be simultaneously sliced from an ingot by cutting the ingot with a multi-wire running while supplying some slurry containing abrasive grains thereto (free abrasive grain type wire saw technique).

Alternatively, in accordance with a known technique, an ingot of a rare earth alloy is sliced using a rotating slicing blade, for example. However, such a technique using a slicing blade results in an undesirably large cutting width, because the cutting edge of a slicing blade is thicker than that of a wire. Because of this inordinately large cutting width, such a technique is an inefficient use of valuable resources.

A rare earth alloy is suitable for use as a magnet material. A magnet has found a wide variety of applications and is now broadly used for various types of electronic appliances. Under the circumstances such as these, it is highly desirable to cut down on the manufacturing cost per rare earth magnet. And the cost would be considerably reduced if a great number of wafers could be produced simultaneously from an ingot of a rare earth alloy such that a cutting width can be reduced by the use of a wire saw and that each wafer has a constant thickness.

Voice coil motors, which are important applications of rare earth magnets, are being made in increasingly smaller sizes. Accordingly, the thickness of a rare earth magnet used for this application must be significantly reduced compared with that conventionally required. It would therefore be advantageous if a rare earth magnet used for a voice coil motor could be manufactured with a wire saw having a small cutting width.

However, no one has reported on successfully cutting a rare earth alloy in accordance with a practical wire-saw technique. The present inventors experimentally cut an ingot of a rare earth alloy with a wire saw of the free abrasive grain type. As a result, the present inventors found that since a slurry-circulating pipe was clogged up in a very short amount of time with fine powder and grinding debris (i.e., swarf or sludge) involved with wire sawing, no slurry could be supplied to the wire after that, and the wire eventually snapped. If the slurry was entirely replaced every several hours in order to avoid this problem, wire sawing had to be suspended while the slurry was being replaced. Thus, such machining is not suitable for mass production and it is virtually impossible to put such machining into practice.

The present inventors have also observed that since the sludge was easily deposited in a cut groove, the cutting resistance noticeably increased and the wire was even more likely to snap as a result. The sludge will be easily discharged from a cut groove if the viscosity of the slurry is reduced to a certain value. However, according to the experiments by the inventors, as the viscosity of the slurry was lower, abrasive grains in the slurry were less likely to reside on the wire, and as a result, the rigid, hard-to-cut rare earth alloy failed to be efficiently cut. It was found, therefore, that the viscosity of the slurry should be controlled.

Furthermore, the cutting accuracy was found considerably deteriorated because various unwanted operating failures frequently happened during the cutting process. For example, the wire often disengaged from rollers, around which the wire was wound, because the sludge was also likely to be deposited on the grooves of the rollers. None of these problems has ever been observed during cutting an ingot of silicon or glass in accordance with a conventional wire saw technique.

In general, a rare earth alloy includes a rigid tetragonal phase and a viscous rare earth rich phase. Cutting of such a rare earth alloy is difficult compared with cutting of silicon. Therefore, when a rare earth alloy is to be cut with a wire saw, a relatively large tension must be applied to the wire. If the wire tension is made large, however, a burden is placed on rollers for driving the wire, causing the rollers to abrade. In particular, the sludge of a rare earth alloy that tends to aggregate together may be deposited on the grooves of the rollers. This will further facilitate the abrasion of the rollers due to the wire tension.

If the wire tension is made small, the abrasion of the rollers is suppressed. However, the planarity (or flatness) of a cut face of work is reduced. This results in reduction in cutting accuracy, so that the resultant work is unsuitable for practical use.

The present inventors studied the possibility of producing the rollers from a metal material. It was found, however, that metal rollers were not usable because the wire slipped with respect to the metal rollers.

SUMMARY OF THE INVENTION

A prime object of the present invention is providing a method, as well as an apparatus, for cutting a rare earth alloy, capable of suppressing abrasion of rollers to ensure long-time continuous operation and improving the planarity of a cut face.

Another object of the present invention is providing a method for manufacturing rare earth magnets using the method for cutting a rare earth alloy.

Still another object of the present invention is providing a voice coil motor including a rare earth magnet manufactured by the method of the present invention.

The method for cutting a rare earth alloy of this invention includes cutting an object to be machined while supplying slurry containing dispersed abrasive grains between a wire and the object to be machined. The wire is driven with a drive member, at least a wire contact face of the drive member being composed of an organic polymer material including rubber and elastomer, and cutting is carried out while a tension in a range between 14.7 N and 39.2 N is applied to the wire.

Alternatively, the method for cutting a rare earth alloy of this invention includes cutting an object to be machined while supplying slurry containing dispersed abrasive grains between a wire and the object to be machined. The wire is driven with a drive member, at least a wire contact face of the drive member being composed of an organic polymer material, and a temperature of the slurry is controlled to fall within a predetermined range.

In a preferred embodiment, the method includes the steps of: collecting the slurry containing sludge produced during cutting of the object to be machined to remove the sludge from the slurry; and performing temperature control for the sludge-removed slurry.

In another preferred embodiment, the rare earth alloy is a R—Fe—B rare earth sintered magnet (where R is a rare earth element including Y).

Preferably, a viscosity of the slurry at 25° C. is in a range from 92 to 175 mPa·sec.

Preferably, sludge is removed from the slurry with a magnetic separator. The magnetic separator preferably generates a magnetic field of 0.3 tesla or more in a region where the sludge is removed.

Preferably, the rare earth alloy is cut while the rare earth alloy is lowered from upward to downward with respect to the wire.

Preferably, the rare earth alloy is divided into a plurality of blocks and secured together, and at least part of the supply of the slurry is performed through gaps between the plurality of blocks.

In a preferred embodiment, means for supplying the slurry to the wire is disposed at a position upstream of a wire running direction with respect to the object to be machined.

In another preferred embodiment, the drive member is a roller made of ester-type urethane rubber.

The method for manufacturing rare earth alloy plates of this invention includes the steps of: producing an ingot of a rare earth alloy; and separating a plurality of rare earth alloy plates from the ingot by any of the above methods for cutting a rare earth alloy.

The method for manufacturing rare earth magnets of this invention includes the steps of: producing a rare earth magnet by compacting a rare earth alloy powder and sintering a compact; and separating a plurality of magnets from the rare earth magnet by any of the above methods for cutting a rare earth alloy.

The voice coil motor of this invention includes the rare earth magnet manufactured by the above method for manufacturing rare earth magnets.

In a preferred embodiment, the thickness of the rare earth magnet is in a range from 0.5 to 3.0 mm.

The apparatus for cutting a rare earth alloy of the present invention cuts an object to be machined while slurry containing dispersed abrasive grains is supplied between a wire and the object to be machined. The apparatus includes: means for supplying the slurry between the wire and the object to be machined; a drive member for driving the wire, at least a wire contact face of the drive member being composed of an organic polymer material; and means for applying to the wire a tension in a range between 14.7 N and 39.2 N.

Alternatively, the apparatus for cutting a rare earth alloy of this invention cuts an object to be machined while slurry containing dispersed abrasive grains is supplied between a wire and the object to be machined. The apparatus includes: means for supplying the slurry between the wire and the object to be machined; drive member for driving the wire, at least a wire contact face of the drive member being composed of an organic polymer material; a temperature detector for detecting a temperature of the slurry; and a cooling device for cooling the slurry to control the temperature of the slurry to fall within a predetermined range.

In a preferred embodiment, the apparatus further includes means for heating the slurry.

Preferably, the apparatus further includes a magnetic separator for separating sludge of the rare earth alloy produced during the cutting of the rare earth alloy from the slurry by use of a magnetic field.

Preferably, the magnetic separator generates a magnetic field of 0.3 tesla or more in a region where the sludge is removed.

Preferably, a viscosity of the slurry at 25° C. is in a range from 92 to 175 mPa·sec.

DETAILED DESCRIPTION OF THE INVENTION

Figure 1:
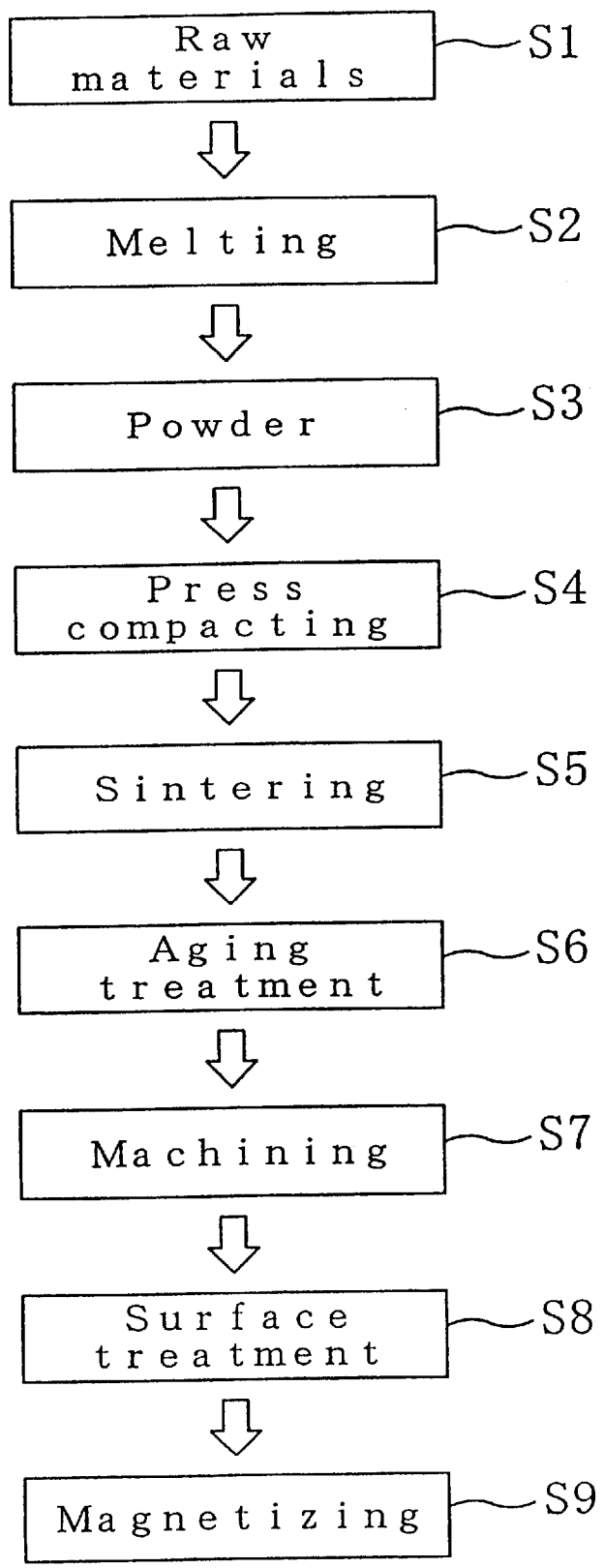
FIG. 1 is a flowchart illustrating the procedure of forming an Nd—Fe—B permanent magnet.

The present inventors found that when a rare earth alloy was cut with a wire saw, sludge of the rare earth alloy, produced during the machining, quickly precipitated in the slurry and aggregated in a short amount of time. Based on this result, the present inventors regarded this phenomenon as a principal factor of preventing cutting a rare earth alloy with a wire saw from being put into practice. If the aggregated sludge obstructs the circulation of the slurry in a slurry-circulating pipe of a wire saw machine, the slurry-circulating pipe is clogged up. Accordingly, it is impossible to carry out a long-time continuous operation unless the slurry is replaced frequently.

The sludge precipitates and aggregates probably because the specific gravity of a rare earth element and iron as components of a rare earth alloy is larger than that of a dispersion medium (e.g., oil) of the slurry. A dispersion medium having a comparatively high viscosity is selected as the dispersion medium for the slurry so that the abrasive grains, having a larger specific gravity than the dispersion medium, are well dispersed in the slurry. The specific gravities of SiC, diamond, and alumina ($Al_2O_3$), ordinarily used as abrasive grains, are in an approximate range from about 3 to about 4. The specific gravity of sludge produced when silicon or quartz glass is cut with a wire saw is also about 3 to about 4. Accordingly, if an ingot of silicon or quartz glass is cut in accordance with a wire saw technique, the sludge, as well as abrasive grains, is likely to be uniformly dispersed in the slurry, and hardly precipitates or aggregates. Therefore, no serious problems have ever been caused because of such precipitation or aggregation.

The problem of sludge aggregation seems to be solved by increasing the viscosity of slurry, because the sludge of a rare earth alloy could be dispersed more uniformly in the slurry in such a case. However, the present inventors confirmed based on experimental results that various problems like wire snapping still happened even when the viscosity of the slurry was set higher. This is probably because the cutting resistance of a rare earth alloy is far higher than that of silicon, for example. In view of these facts, the present inventors intentionally set the viscosity of slurry at a lower value than a conventional one, thereby increasing the discharge efficiency of the sludge and reducing the cutting resistance of the rare earth alloy. It was further decided to separate and remove the sludge from the slurry by a magnetic field in consideration of the properties of the sludge of a rare earth alloy. Specifically, the sludge is hard to be dispersed but is easily attracted to a magnet. By taking these measures, clogging can be eliminated from the inside of a circulating pipe, slurry no longer needs to be replaced so frequently, and the cutting machine can be operated continuously for a tremendously longer period of time compared to the prior art.

It is noted that when the alloy sludge is attracted by the magnetic field, the sludge receives strong resistance by the viscosity of oil in the slurry. However, according to the present invention, the viscosity of the slurry used is set relatively low and a strong magnetic field is employed to attract the sludge. Accordingly, the sludge can be separated sufficiently and practically.

Further, according to the present invention, the tension applied to the wire is adjusted to fall within the range between 14.7 N and 39.2 N. By this adjustment, rollers are prevented from abrading due to the wire tension, and moreover, a rare earth alloy can be cut into thin slices while keeping high planarity of cut faces.

Moreover, according to the present invention, the temperature of the slurry is controlled to fall within a predetermined range (e.g., between 25° C. and 30° C.), to suppress the temperature from varying depending on heat generated during the cutting process. If the temperature of the slurry rises with the cutting operation, the viscosity of the slurry changes from the value at room temperature, resulting in degrading the dispersion/discharge properties of the sludge. The present invention solves this problem by controlling the temperature of the slurry, so that high processing accuracy can be attained and maintained over a prolonged period of time.

Hereinafter, embodiments of the present invention will be described with reference to the accompanying drawings.

First, an exemplary method for manufacturing rare earth alloy plates according to the present invention will be described. In this embodiment, a ternary rare earth alloyed compound Nd—Fe—B, mainly composed of neodymium (Nd), iron (Fe) and boron (B), may be used. Alternatively, a rare earth alloyed compound, in which Dy (dysprosium) and Co (cobalt) are substituted for part of Nd and part of Fe, respectively, in Nd—Fe—B, may also be used. Nd—Fe—B type magnets is known as very strong rare earth magnets having a maximum energy product exceeding 320 $kJ/m^3$.

A method for producing an ingot of Nd—Fe—B will be briefly described with reference to the flowchart of FIG. 1. For more details about the composition of a rare earth alloy as a magnet material and a method for manufacturing the same, see U.S. Pat. Nos. 4,770,723 and 4,792,368, for example.

First, in Step S1 shown in FIG. 1, raw materials are exactly scaled at a predetermined ratio of mole fractions. Then, in Step S2, the raw materials are melted in a high-frequency melting furnace in vacuum or within an argon gas atmosphere. The molten raw materials are cast into a water-cooled mold, thereby preparing a raw material alloy at the predetermined ratio. Next, in Step S3, the raw material alloy is pulverized to prepare fine powder having a mean particle size of about 3 to about 4 μm. Subsequently, in Step S4, the fine powder is fed into a die assembly and subjected to press compacting in a magnetic field. During this process step, the press compacting is performed after the fine powder has been mixed with a lubricant if necessary. Then, in Step S5, a compact of alloy powder is sintered at about 1,000° C. to about 1,200° C. Thereafter, in Step S6, an aging heat treatment is performed at about 600° C. in order to increase the coercive force of the magnet. An ingot of a rare earth alloy can be prepared in this manner. The size of the ingot is 30 mm×50 mm×60 mm, for example.

In Step S7, the ingot of the rare earth alloy is cut and machined, thereby slicing the ingot into a plurality of thin plates (these plates will be called sometimes "substrates" and sometimes "wafers"). Before the steps from Step S8 on are described, a method for cutting the ingot of a rare earth alloy in accordance with the wire saw technique of the present invention will be described in detail below.

Figure 2A:
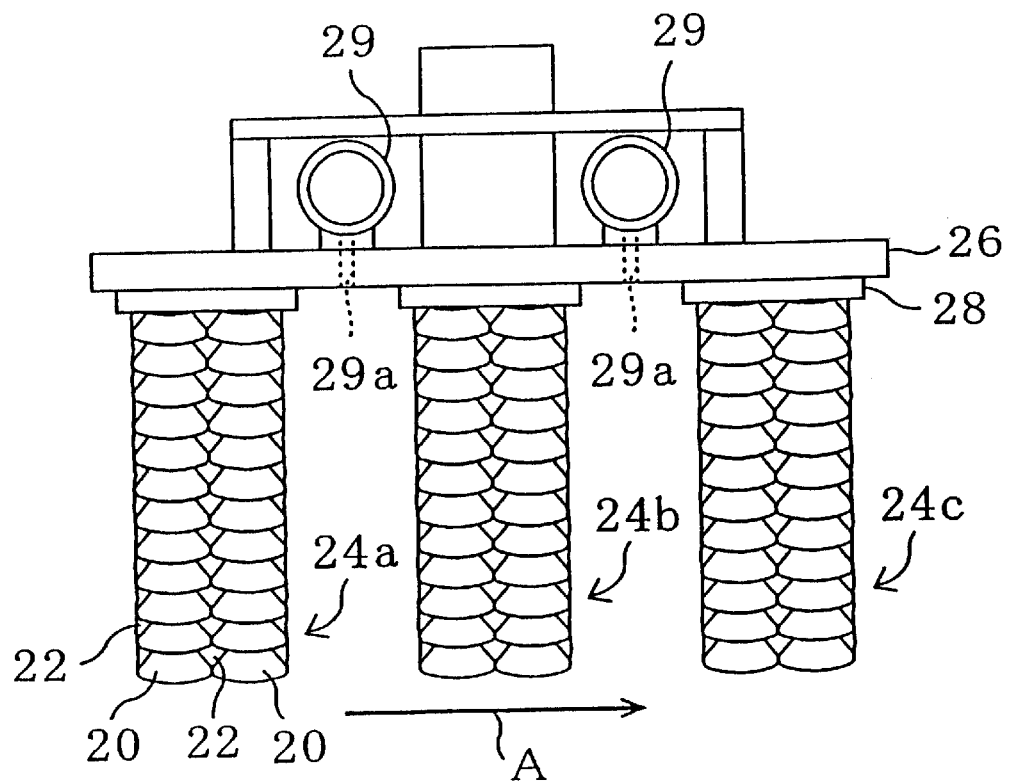
FIG. 2A is a front view of blocks of ingots secured to a work plate.
Figure 2B:
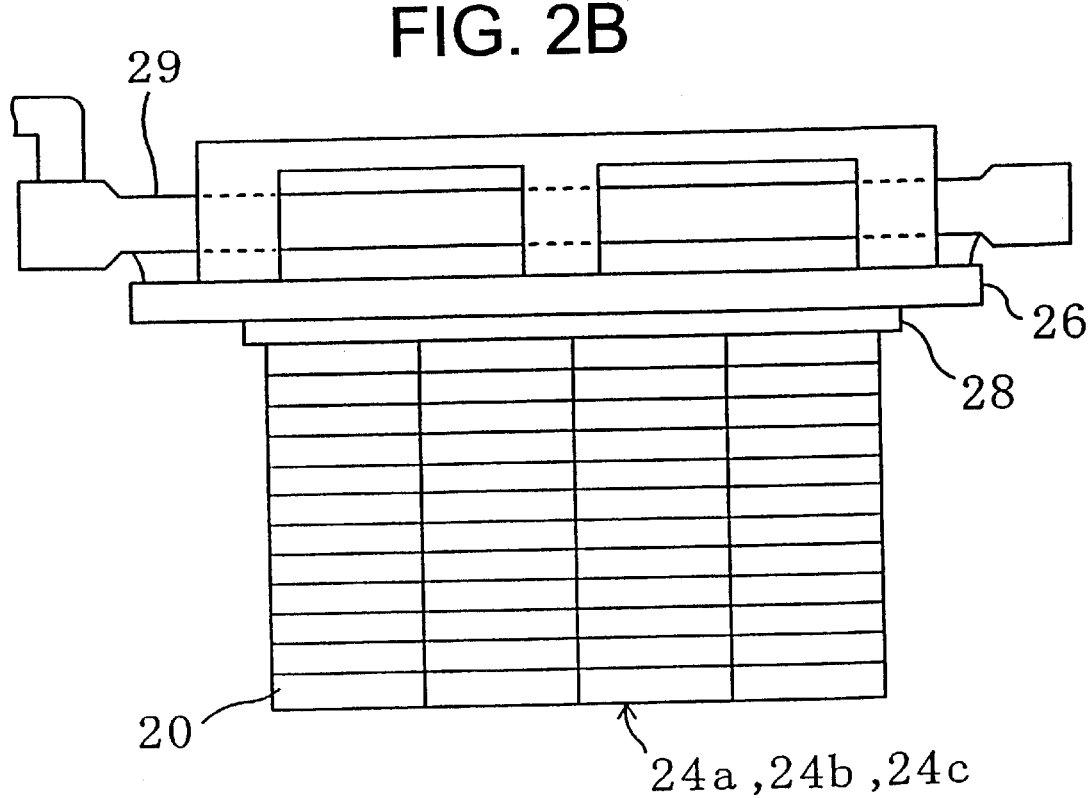
FIG. 2B is a side view thereof.

FIGS. 2A and 2B will be referred to. First, a plurality of ingots 20, produced in accordance with the method described above, are bonded to each other with an adhesive 22 made of an epoxy resin, for example. The ingots 20 are secured to a ferrous work plate 26 after these ingots have been stacked one upon the other to form a plurality of blocks 24a through 24c. The work plate 26 and the blocks 24a through 24c are also bonded to each other with the adhesive 22. More specifically, base plates 28 made of carbon are placed as a dummy between the work plate 26 and each of the blocks 24a through 24c. The carbon base plates 28 are also bonded to the work plate 26 and the blocks 24a through 24c with the adhesive 22. The carbon base plates 28 are cut by a wire saw after the blocks 24a through 24c have been cut and until the work plate 26 stops lowering. That is to say, the base plates 28 function as a dummy for protecting the work plate 26.

In this embodiment, the size of each of the blocks 24a through 24c is designed at about 100 mm when measured in the direction indicated by the arrow A in FIG. 2A (hereinafter, this direction is called a "wire running direction"). Since the size of each ingot 20 measured in the wire running direction is about 50 mm in this embodiment, each of the blocks 24a through 24c is made up by stacking a pair of ingots 20, disposed side by side in the wire running direction, one upon the other.

Also, in this specification, the ingots 20 secured to the work plate 26 are collectively called as "work". By dividing this work into a plurality of blocks, the following effects can be attained.

If the size of a mass of work in the wire running direction is so large as to exceed the maximum distance the slurry can reach, then the slurry cannot be supplied sufficiently to some of the regions of the work to be cut. As a result, a wire possibly snaps. However, since the work of this embodiment is divided into blocks 24a through 24c of an appropriate size, the slurry can be supplied into the gaps between the blocks 24a through 24c and therefore the problem of insufficiently supplied slurry can be solved. This also allows sludge to be discharged when the wire passes the gaps between the blocks. The cutting efficiency therefore improves.

In this embodiment, two slurry supply pipes 29 are disposed on the upper side of the work plate 26 to supply the slurry into the gaps between the blocks 24a through 24c. Fresh slurry is sprayed downward from slit-shaped nozzles 29a (also generally referred to as apertures) of the slurry supply pipes 29. The sludge deposited on the wire can be washed away by the slurry supplied from the slit-shaped nozzles 29a between the blocks. The slurry supply pipes 29 receive fresh slurry not containing sludge or slurry from which the sludge has been removed, from a slurry supply tank (described hereinbelow). The slurry supply pipes 29 have a double pipe structure, for example. The width of each of the slits 29a is designed to change in the longitudinal direction so as to supply the slurry uniformly. A structure of a slurry supply apparatus usable as the slurry supply pipes 29 is disclosed in Japanese Laid-Open Publication No. 7-195358, for example.

In this embodiment, the work is divided into a plurality of blocks in the manner described above. However, the size of each of the blocks 24a through 24c when measured in the wire running direction is variable with the viscosity of the slurry and the wire running speed. The number and disposition of the ingots 20 making up one block are also variable with the size of each ingot 20. Accordingly, the work should be appropriately divided into blocks of an optimum size in view of these factors. In this embodiment, the slurry supply pipes 29 are disposed on the upper side of the work plate 26. Alternatively, they may be disposed on the lower side of the work plate 26 to supply the slurry to the gaps between the blocks 24a through 24c.

Next, the main portion 30 of the wire saw machine preferably used in this embodiment will be described with reference to FIGS. 3A and 3B. This wire saw machine includes three main rollers 34a through 34c, around which a single wire 32 can be wound numerous number of times. Among these rollers, two main rollers 34a and 34b are rotatably supported by the wire saw machine, but are not directly connected to any driving means such as a motor. Thus, these rollers function as coupled driven rollers. In contrast, the other main roller 34c is connected to a driver such as a motor (not shown), receives desired rotation force from the driver, and can rotate at a set speed. The main roller 34c can transmit rotation force to the other two main rollers 34a and 34b via the wire 32, and therefore functions as a driving roller.

The wire 32 is guided in accordance with the rotation of the main rollers 34a through 34c, and let out from a reel (not shown) and wound on another reel (not shown, either) while moving in either a reciprocating or unidirectional motion at a predetermined speed (for example, 600 to 1000 m/min).

Figure 3A:
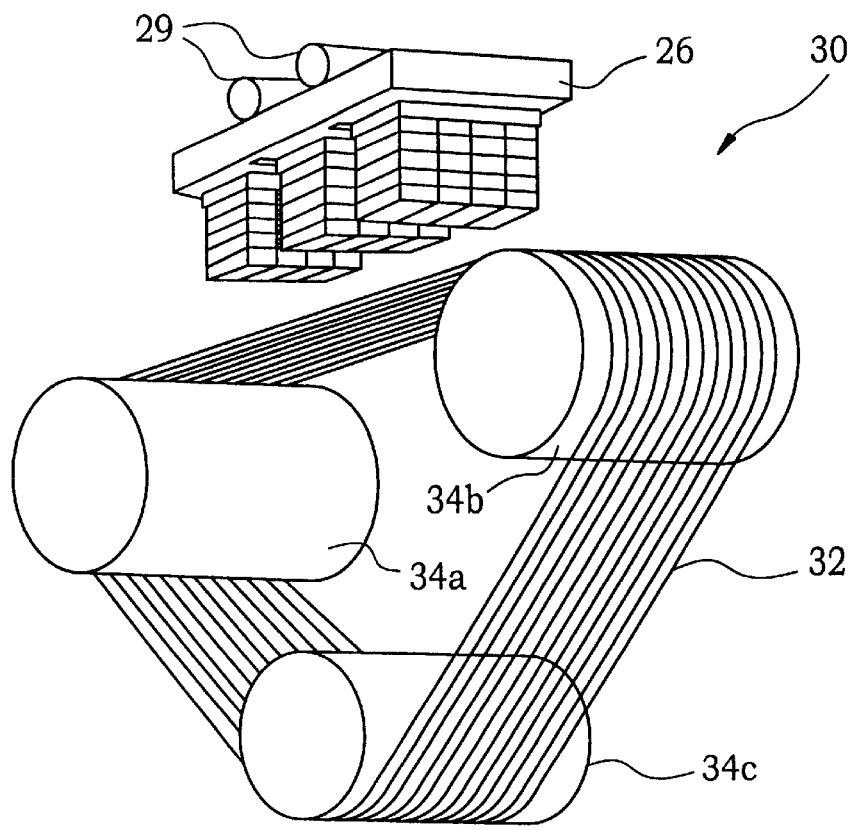
FIG. 3A is a perspective view illustrating the main portion of a wire saw machine preferably used in an embodiment of the present invention.

Next, the configuration of the main rollers 34a through 34c will be described with reference to FIGS. 4A and 4B. A sleeve 62 is provided on the surface of each of the main rollers 34a through 34c. A plurality of V-shaped grooves 64 are formed at a predetermined pitch on the outer circumference of the sleeve 62 (on the outer circumference of each of the main rollers 34a through 34c). The wire 32 is wound around the main rollers 34a through 34c so as to engage with the grooves 64. The wound pitch of the wire 32 is defined by the pitch of the grooves. In this embodiment, the pitch is set at about 2.0 mm. The pitch is determined depending on the thickness of thin plates to be obtained by cutting the ingots. Therefore, the multi-grooved rollers 34a through 34c having an appropriate pitch are selected and used as appropriate. The sleeve 62 is adhered to the outer circumference of a cylindrical holder 60 and can rotate integrally with the holder 60. FIGS. 3A and 3B show a state where the single wire 32 is wound along a large number of grooves 64 of the main rollers 34a through 34c.

In this embodiment, the surface portion of each roller (the sleeve 62) is made of ester-type urethane rubber (hard elastomer), an organic polymer material. In a conventional machine for cutting a silicon ingot with a wire saw, the sleeve is made of ether-type urethane rubber such that the grooves can be formed with higher precision. However, the present inventors confirmed based on experimental results that a sleeve made of ether-type urethane rubber is very likely to swell with respect to the slurry used in this embodiment and adversely decreases the abrasion resistance of the rollers. Accordingly, such a sleeve is unusable in only about ten hours of continuous operation, and therefore far from being practically usable. The slurry preferably used in this embodiment contains a surfactant or dispersant at a relatively low concentration. Accordingly, although the ether-type urethane rubber does not swell with respect to the slurry used for cutting a silicon ingot with a wire saw, the rubber seems to swell more easily with such slurry. Ester-type urethane rubber having high hardness is relatively expensive. However, this rubber should be used in order to enable a long-duration continuous operation using the slurry of this embodiment. If the main rollers are formed using the ester-type urethane rubber, the machine can be continuously operated for a long time period substantially without causing the problem of swelling. The use of this material also eliminates a trouble of disengagement of the wire from the grooves that frequently occurs for metal rollers.

The V-shaped grooves 64 formed on the main rollers 34a through 34c of this embodiment have a depth of 0.3 mm or more. In cutting a silicon ingot with a conventional machine, the depth of the grooves is set at most at about 0.2 mm. However, if a viscous phase-containing ingot such as an ingot of a rare earth alloy is machined with main rollers having such shallow grooves, the wire is flexed to a large degree and frequently disengages from the grooves. As a result, the wire snaps because adjacent parts of the wire come into contact with each other. In contrast, if the depth of the grooves is set at 0.3 mm or more, such a problem can be eliminated.

If the surfaces of the rollers are too hard, the wire tends to easily slip with respect to the surfaces of the rollers. This slip may sometimes increase the amount of abrasion of the rollers. Using the ester-type urethane rubber that has a moderate hardness, this trouble of abrasion of the rollers can be effectively suppressed.

The wire is made of hard drawn steel wire (e.g., piano wire) and the thickness thereof is set in the range from about 0.06 to about 0.25 mm. The wire may be made of an alloy such as Ni—Cr and Fe—Ni, a metal having a high melting point, such as W and Mo, or a bundle of nylon fibers. The abrasive grains may be made of non-magnetic material such as SiC, diamond, alumina ($Al_2O_3$), B, C, CBN (cubic boron nitride), or the like.

Referring again to FIGS. 3A and 3B, during the cutting process, the work is pressed against a portion of the running wire 32 that is stretched between the main rollers 34a and 34b. In this embodiment, the slurry can be supplied onto the wire 32 from at least three points, two of which correspond to the slit-shaped nozzles 29a of the slurry supply pipes 29 disposed in and above the work plate 26 to supply the slurry through the gaps between the blocks. The other slurry supply point is a nozzle 36a (also generally referred to as an aperture) disposed on the left-hand side of the work in FIG. 3B (upstream of the wire running direction A). Optionally, the slurry may be supplied not only from these nozzles 29a and 36a but also from a nozzle 36b (also generally referred to as apertures) disposed downstream of the wire running direction A.

In this embodiment, means for supplying the slurry to a wire (in the illustrated example, the nozzles 29a, 36a, and 36b) are disposed at positions upstream and downstream of the wire running direction with respect to the blocks 24a through 24c. Therefore, rollers are washed with part of the slurry sprayed from the nozzles, and also sludge attached to the surface of the wire can be washed away with the slurry before the sludge reaches the rollers. Thus, abrasion of the rollers is suppressed.

In this embodiment, the composition of the slurry is adjusted so that the viscosity of the slurry at 25° C. is in the range from 92 to 175 millipascal-seconds (mPa·sec). A dispersion medium used for the slurry may include purified mineral oil as a main component, an ester (25 to 35%), an anticorrosive additive (1% or less), and an extreme-pressure additive (1% or less). As the dispersion medium for the slurry, a material other than oil, such as a glycolic water-soluble solution, may be used.

Since the slurry with a low viscosity is used in this embodiment as described above, sludge produced in a cut groove being formed into a rare earth alloy is allowed to rapidly flow out of the cut groove (i.e., the discharge efficiency is high) and can be expelled from the region subjected to the cutting. In other words, good cleanability is exhibited. Accordingly, the sludge in the cut groove does not strongly interfere with the wire's running, and the problems of wire snapping due to the increase in cutting resistance can be solved. In addition, by using the slurry having a low viscosity, the amount of sludge transported by the running wire to the main rollers can be reduced. As a result, the deposition of the sludge in the grooves of the main rollers can also be suppressed. Consequently, wire snapping can be prevented and the wire can be easily detached from the work after the work has been cut. Further, such slurry effectively cools the cutting portion and thereby further improving grindability of the abrasive grains against the work.

Figure 3B:
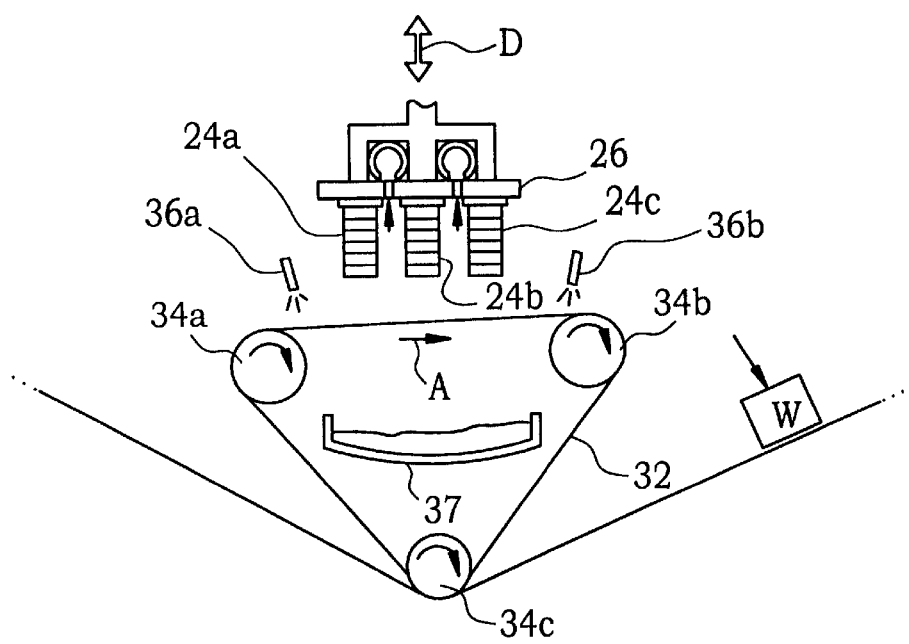
FIG. 3B is a front view thereof.
Figure 4A:
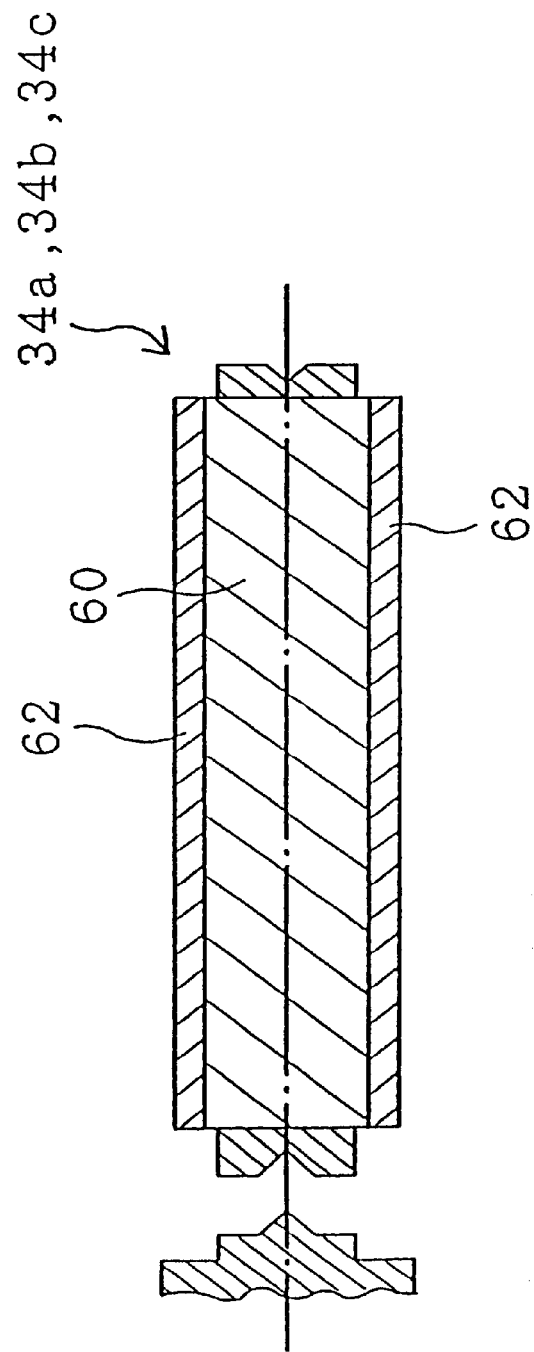
FIG. 4A is an axial cross-sectional view of a main roller.
Figure 4B:
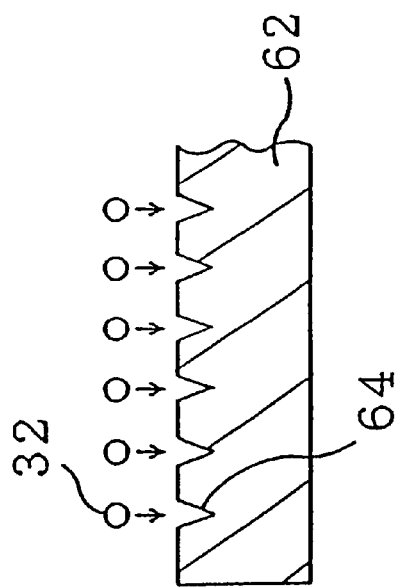
FIG. 4B is an axial cross-sectional view illustrating, on a larger scale, part of a cylindrical sleeve provided for the outer circumference of the main roller.

FIG. 3B will be referred to. During the work cutting process, the work plate 26 is moved downward along the arrow D by a driver (not shown) at a predetermined speed (e.g., 0.3 to 1.0 mm/min), so that the work secured to the work plate 26 is pressed against the wire 32 running horizontally (along the arrow A). By supplying a sufficient amount of slurry between the work and the wire 32, sludge is discharged from between the work and the wire 32, whereby the work can be cut continuously. If the work plate 26 is lowered at a higher speed, the cutting speed can be improved. However, since the cutting resistance increases in such a case, the wire 32 is likely to wave and the planarity of the cut face of the work possibly decreases. If the planarity of the cut face of the work decreases, the time taken to perform grinding during a subsequent process step increases or defective products are formed at a higher percentage. Accordingly, it is necessary to set the lowering speed, or the cutting speed, of the work within an appropriate range.

When the work is moved downward, the wire 32 wound at a predetermined pitch grinds the work as a multi-wire saw, thereby simultaneously forming a large number of machined grooves (cut grooves) into the work and increasing the depth of the grooves as the machining proceeds. And when the machined grooves have completely passed through each ingot, the cutting process on the ingot is finished. As a result, a large number of wafers, each having a thickness determined by the pitch of the wire lines and the thickness of the wire, are sliced from the ingot simultaneously. After all the ingots 20 have been cut, the work plate 26 is lifted by the driver along the arrow D. Thereafter, the respective blocks are removed from the work plate 26 and then the cut wafers are removed from each block.

In this embodiment, the tension of the wire during the cutting process is adjusted to fall in the range between 14.7N and 39.2N. If the wire tension exceeds the top of this range, the planarity of the cut face of the work improves, but the abrasion of the rollers is further increased. If the wire tension is less than 14.7N, the planarity of the cut face of the work decreases. The reason why the wire tension should preferably be set within the above range will be described later in detail with reference to FIG. 12.

In this embodiment, the cutting process is carried out while lowering the work from above the wire 32. Accordingly, the ingots 20, which have already been cut, are still bonded to the work plate 26 with the adhesive 22 and lowered along with the work plate 26. In other words, the ingots 20, which have already been cut, are located under the wire 32. Accordingly, even if the cut portions of the work happen to separate or drop from the work, such portions are received by a collecting drain 37 (see, FIG. 5) and never come into contact with the wire 32 again. Thus, the alloy plates already cut are passed to the next process step while maintaining high quality.

By carrying out the cutting process while the work is lowered from above the wire 32 as described above, another advantage is provided. That is, the sludge produced from the cutting of the work, which has a specific gravity greater than that of silicon, can be easily discharged from the cutting grooves by the force of gravity. This reduces the load applied to the wire when detaching work from the wire, and thus contributes to suppression of the abrasion of the rollers.

Further, since the work is pressed against the wire 32 from above, the wire 32 is warped in the direction that results in increasing the length of the portion of the wire 32 in contact with the rollers 34a, 34b around which the wire 32 is wound. Therefore, since the contact area between the rollers 34a, 34b and the wire 32 increases, slip of the wire 32 is less likely to occur, and the pressing force per unit contact area of the wire 32 against the rollers 34a, 34b decreases. The decrease in the pressing force of the wire 32 contributes to prevention of the abrasion of the rollers.

Figure 5:
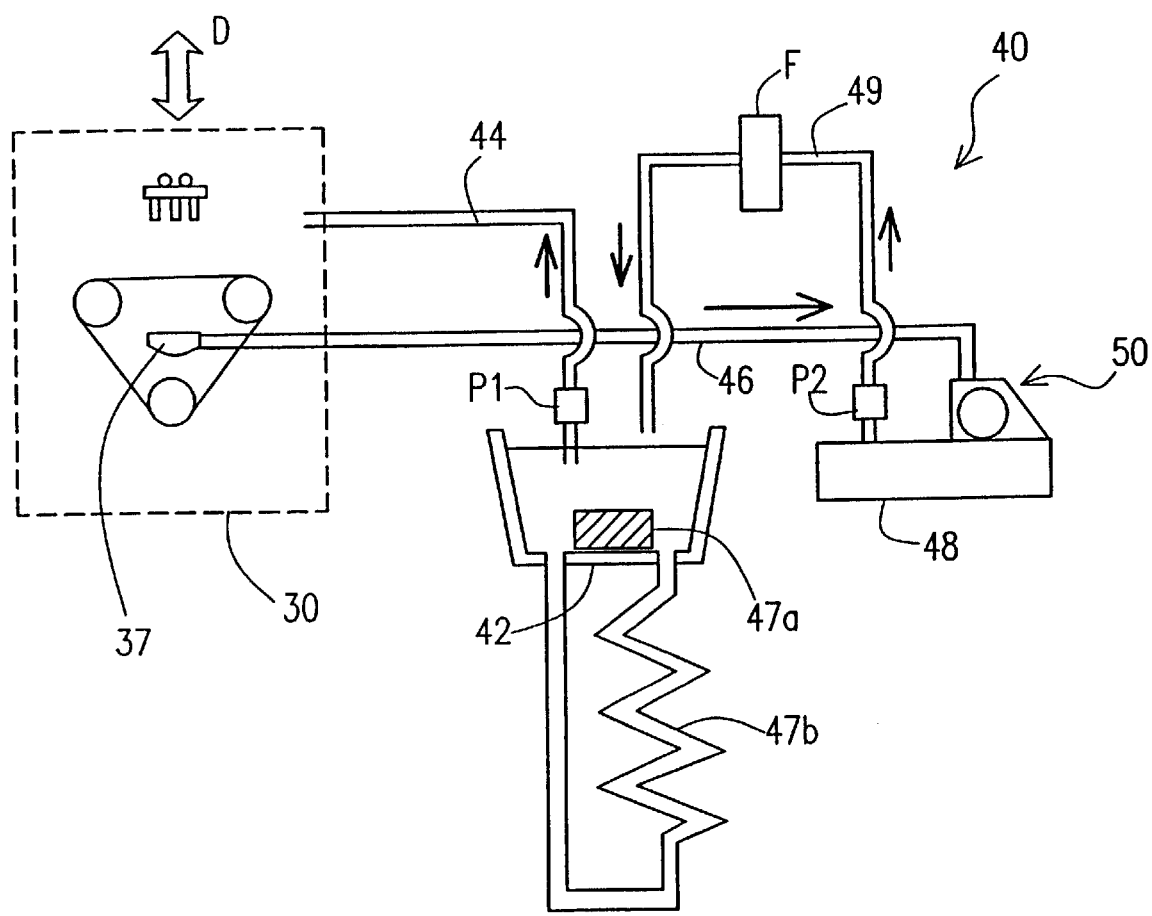
FIG. 5 is a schematic representation illustrating a slurry circulating system of the wire saw machine.

Next, the schematic arrangement of a slurry circulating system of the wire saw machine 40 will be described with reference to FIG. 5. As schematically shown in FIG. 5, the wire saw machine 40 includes a slurry circulating system for supplying the slurry to the main portion 30 of the machine 40 and for collecting the used slurry containing the sludge produced by the machining.

In this machine 40, the slurry is supplied from a slurry supply tank 42 through a first circulating pipe 44 into the slurry supply pipes 29 above the work plate 26 and the nozzles 36a and 36b shown in FIGS. 3A and 3B during the cutting process of the work. A pump P1 is used for this supply. The slurry, which has been used for cutting, drips from the machined part and the surrounding regions thereof so as to be received by a collecting drain 37 located under the work plate 26. Then, the slurry is transported from the collecting drain 37 through a second circulating pipe 46 into a separation reservoir, where the slurry is subjected to a sludge separation process by a magnetic separator 50, which will be described later. The slurry is then reserved in a recovery tank 48. The slurry, which has substantially regained its initial state before the cutting process by the sludge separation process, is transported through a third circulating pipe 49 into the slurry supply tank 42. A relay pump P2 is used for this transportation. A filter F is inserted midway the third circulating pipe 49 for removing sludge that has escaped the removal by the magnetic separator 50. A bag-shaped filter is preferably used as the filter F.

Fine sludge that has passed through the filter F is settled in the slurry supply tank 42. Fine sludge tends to aggregate together since it has been magnetized by the magnetic separator 50, and thus is easily settled. Therefore, the amount of sludge remaining in the slurry to be supplied into the main portion 30 through the first circulating pipe 44 can further be reduced.

In this embodiment, while the supply and recovery of the slurry are performed in a cyclic fashion, the separation and removal of the sludge are carried out efficiently in this manner. Accordingly, replacement of the slurry is not required for a considerably long duration, and thus the cutting process can be performed continuously for a very long period of time. In the slurry circulating system, about 100 to 300 liters of slurry can be circulated. In order to maintain the viscosity of the slurry within a desired range, new slurry is preferably supplied at appropriate time intervals. For this purpose, the viscosity of the slurry may be measured at regular intervals and if the viscosity of the slurry is out of the defined range, new slurry may be supplied to the machine (e.g., the slurry supply tank 42) as required. Such partial supply of the slurry is totally different from the conventional overall exchange of slurry in that this supply can be made without suspending the cutting process.

Further, as shown in FIG. 5, the slurry supply tank 42 in this embodiment is provided with a temperature sensor 47a and a cooling device 47b. If the temperature of the slurry detected by the temperature sensor 47a exceeds a predetermined value (e.g., 30° C.), the cooling device 47b is activated to cool the slurry in the slurry supply tank 42. The temperature of the slurry is preferably detected at a position closer to the cutting portion (or the slurry supply portion), such as a position between the nozzles 36a and 36b and the magnetic separator 50, from the standpoint that the temperature of the slurry at the cutting portion is to be controlled to fall within an appropriate range.

Alternatively, an additional sensor may be provided for measuring the temperature of the slurry just discharged from the cutting portion. In this case, cooling of the slurry is controlled based on the two slurry temperature values measured at two positions. By this measurement, the temperature of the entire slurry under circulation can be detected more accurately, and thus problems such as excessive cooling of the slurry by the cooling device 47b are prevented. This makes it possible to supply the slurry, the temperature of which has been controlled to fall within an appropriate temperature range, to the cutting portion, in a more stable manner.

The output from the temperature sensor 47a is supplied to a controller (not shown), where the detected temperature value is compared with a pre-stored set temperature value. Based on the comparison results, the controller regulates the operation of the cooling device 47b.

The cooling device 47b may be disposed outside the slurry tank 42 as illustrated in FIG. 5 so as to allow the slurry in the slurry tank 42 to circulate between the slurry tank 42 and the cooling device (e.g., heat exchanger) 47b through a bypass pipe. This circulation cooling prevents the temperature-controlled slurry from being directly supplied to the main portion of the wire saw machine. Instead, the average temperature of the slurry in the slurry tank 42 is slowly lowered. As a result, there is no abrupt change in the temperature of the slurry supplied to the main portion of the wire saw machine, and thus the slurry can be supplied at a stable temperature. This prevents the viscosity of the slurry supplied to the cutting portion of the work from abruptly changing, and thus stable cutting is ensured.

Various construction of the cooling device 47b may be adopted. For example, cooling water as a heat exchange medium may flow along the outer circumference of a pipe through which the slurry flows. The slurry flowing through the pipe can be cooled with the cooling water, thereby lowering the temperature. In this case, the temperature of the slurry can be regulated by controlling the flow and/or temperature of the cooling water.

In this embodiment, the temperature control is performed for the slurry that has been subjected to sludge removal processing to be described later. This advantageously prevents occurrence of sludge settlement in the cooling device (heat exchanger) and thus enables the slurry to be cooled efficiently and reliably.

In general, slurry is heated with heat generated during the cutting process, heat of a pump, and the like. The temperature of the slurry may rise beyond room temperature, to as high as about 60° C., for example. In this embodiment, provided with the combination of the temperature sensor 47a and the cooling device 47b, the slurry temperature can be maintained at about 30° C., for example, and thus variation in slurry temperature is suppressed. Accordingly, a desired viscosity of the slurry can be maintained for a prolonged period of time. In this embodiment, the work is cut by pressing the work against the wire from above as described above. During this cutting, the slurry attaches to the wire and is introduced into the cut grooves (i.e., cutting portions) as the wire proceeds into the work. Therefore, by regulating the temperature of the slurry and thus controlling the viscosity of the slurry to fall within a predetermined range, it is ensured that a sufficient amount of slurry is supplied to the cut grooves with the wire to which the slurry attaches.

When room temperature is low, the temperature of the slurry at the start of operation may be too low compared with the steady-state temperature (e.g., 30° C.) during the machining. In such an occasion, the slurry may be circulated before the start of actual cutting process. The slurry is then heated with heat generated by a pump driven for circulating the slurry and the like, so that the temperature of the slurry rises to a level near the steady-state operating temperature. The actual cutting process may be started only after the temperature sensor mentioned above confirms that the temperature of the slurry has reached a desired temperature range.

Figure 6:
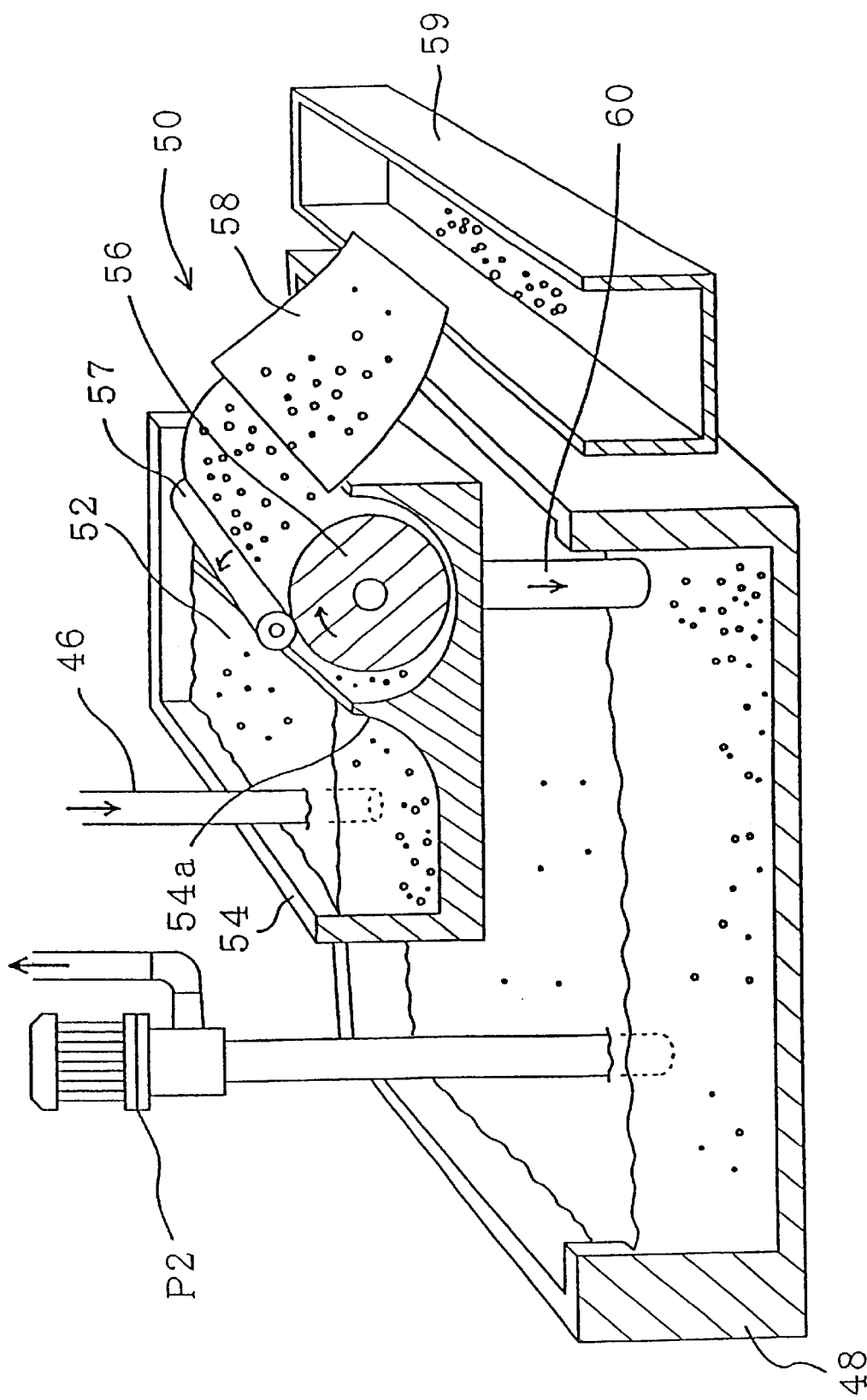
FIG. 6 is a perspective view illustrating a magnetic separator provided for the wire saw machine.

Next, the magnetic separator 50 will be described with reference to FIG. 6. The magnetic separator 50 generates a magnetic field to separate the sludge from the used slurry (dirty liquid) 52 containing the sludge and reserved in the separation reservoir 54. The separation reservoir 54 is provided with a partition 54*a*, which functions to settle a large size of sludge in the separation reservoir 54. A small size of sludge floating in the dirty liquid 52 that has successfully overpassed the partition 54*a* together with the dirty liquid 52 are magnetically separated from the dirty liquid 52 in the manner described below in detail.

The magnetic separator 50 includes: a drum 56 in which a strong magnet (permanent magnet or electromagnet) is disposed; and a squeezing roller 57 rotating while keeping in close contact with part of the outer circumference of the drum 56. The drum 56 is supported to be rotatable around a fixed axis and to be in partial contact with the slurry 52 in the separation reservoir 54. The squeezing roller 57 is made of oilproof rubber or the like and is pressed against the outer circumference of the drum 56 owing to the urging force of a spring. When the drum 56 is rotated by a motor (not shown) in the direction indicated by the arrow, the rotation applies frictional force to the squeezing roller 57 and thereby rotationally drives the squeezing roller 57.

The sludge floating in the slurry 52 is attracted by the magnet in the drum 56 and attached to the outer circumference of the rotating drum 56. The sludge, attached to the outer circumference of the drum 56, is removed from the slurry 52 with the rotation of the drum 56, and then passes between the drum 56 and the squeezing roller 57. Then, the sludge is scraped off the surface of the drum 56 by a scraper 58 and then collected in a sludge box 59. The resultant slurry left after the removal of the sludge is transported to the recovery tank 48 through a pipe 60 located at an end of the length of the drum 56. An exemplary structure of means for removing sludge usable as the magnetic separator 50 is disclosed, for example, in Japanese Utility Model Examined Publication No. 63-23962. According to the results of experiments performed by the present inventors (described later), the magnetic field at the outer circumference (sludge collection face) of the drum 56 in the slurry 52 is preferably set at 0.27 tesla or more, more preferably at 0.3 tesla or more, to attract the sludge of the rare earth alloy in the slurry to the surface of the drum 56. Since the viscosity of the slurry is comparatively low in this embodiment, the magnetic separator 50 can advantageously collect the sludge of the rare earth alloy easily. This is because a lot of sludge can be collected more efficiently owing to the reduction in viscous drag applied to the sludge moving in a magnetic field formed in the slurry 52.

If the sludge is removed efficiently by using such a separator, the viscosity of the slurry can be kept low. Therefore, the cutting load applied to the wire at the cut face of the work can be maintained at a sufficiently low level for a long period of time.

Next, detailed parameters such as the speed of the wire, the viscosity of the slurry, and the work cutting speed will be described with reference to FIGS. 7 through 12.

Figure 7:
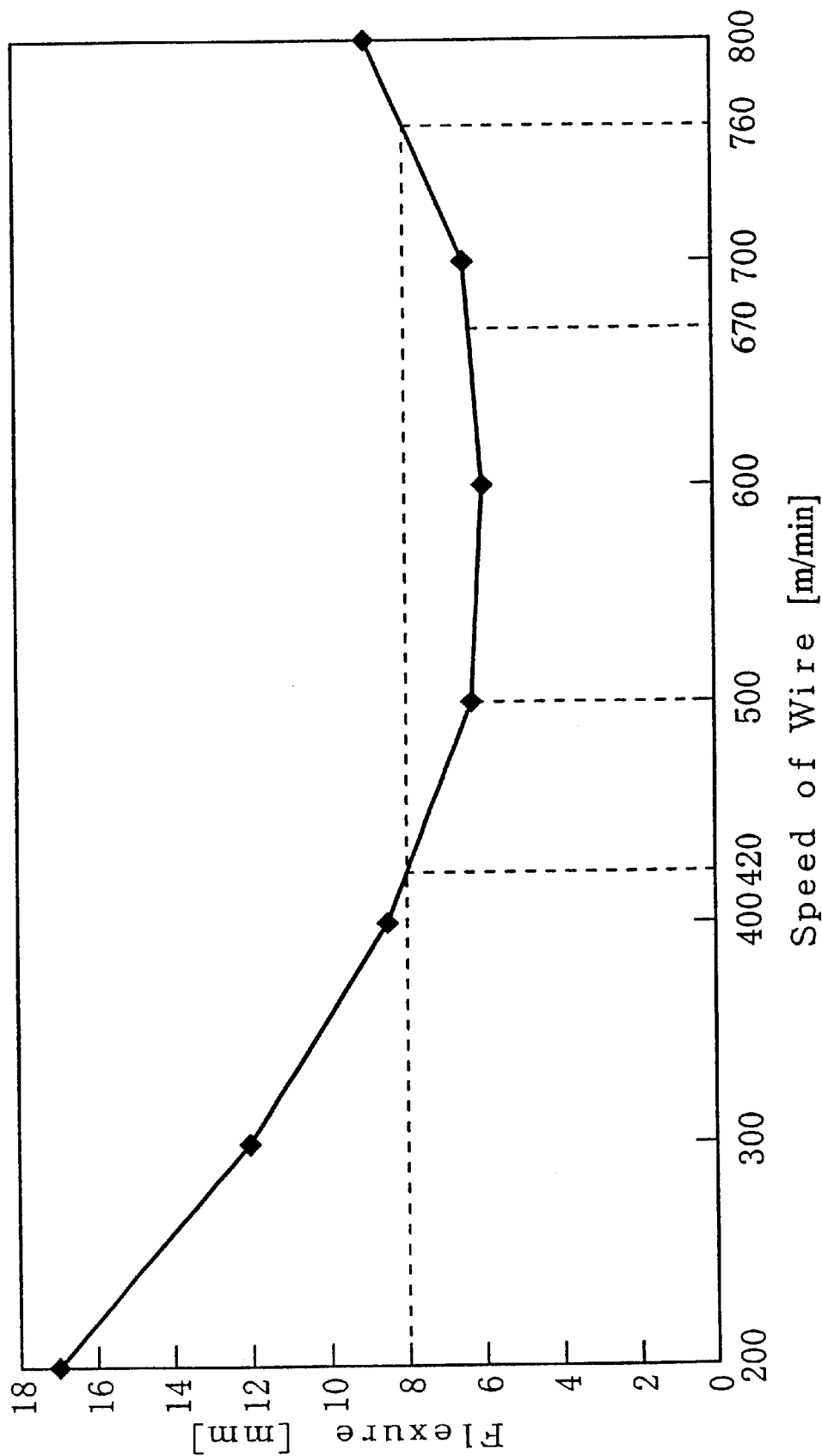
FIG. 7 is a graph illustrating the relationship between the speed and flexure of a wire.

FIG. 7 illustrates the relationship between the speed of the wire (i.e., the speed at which the wire is wound or runs) and the flexure of the wire (diameter: 0.18 mm ø). The experiment was performed while setting the work lowering speed at a substantially constant value in the range from 15 to 25 mm/hr. The viscosity of the slurry used in this experiment was 110 mPa·sec at 25° C. It is noted that similar results to those shown in FIG. 7 were obtained when the work lowering speed was in the range from 15 to 30 mm/hr.

If work cutting with a wire does not proceed smoothly, the flexure of the wire increases. This means that the cutting resistance of the work is large and the work cannot be cut with satisfactory efficiency. Stated otherwise, if the flexure of a wire is small, the work can be cut with good efficiency. As shown in FIG. 7, while the wire speed is within the range from 420 to 760 m/min, the flexure can be suppressed at 8 mm or less. On the other hand, while the wire speed is out of the range from 420 to 760 m/min, the flexure abruptly increases. If the wire speed is increased, the depth of the cutting edge (i.e., the depth of a part of the rare earth alloy that is cut and ground by the abrasive grains on the wire) increases to a certain degree. However, when the wire speed is too much increased, a sufficient amount of slurry cannot reside on the wire and the depth of the cutting edge substantially decreases. While the wire speed is in the range from 500 to 670 m/min, the flexure settles at a minimum level. Accordingly, the wire speed is preferably set within the range from 420 to 760 m/min, more preferably within the range from 500 to 670 m/min.

Figure 8:
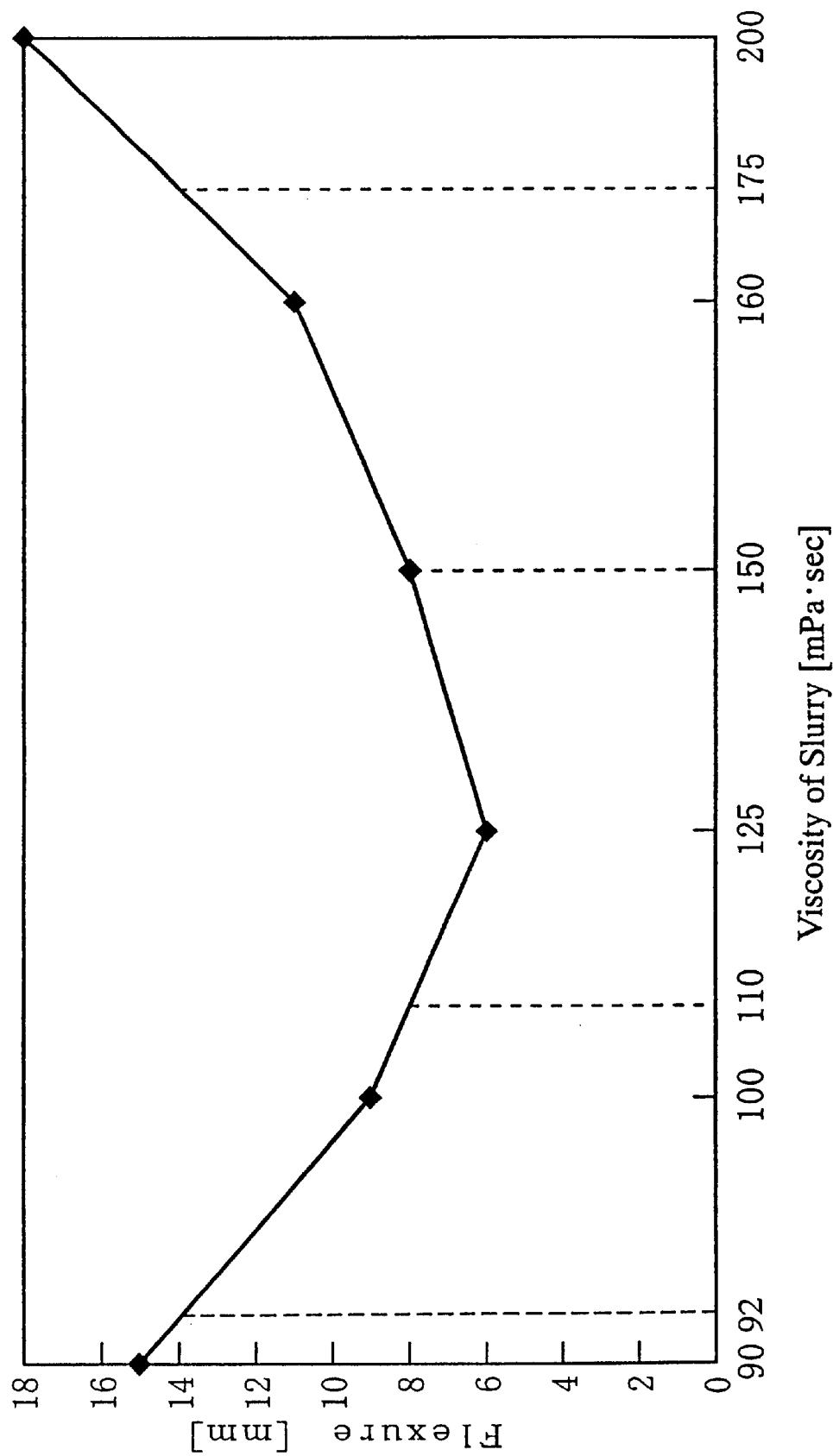
FIG. 8 is a graph illustrating the relationship between the viscosity of slurry and the flexure of the wire.

FIG. 8 illustrates the relationship between the viscosity of the slurry and the flexure of the wire. As shown in FIG. 8, while the viscosity of the slurry at 25° C. is in the range from 92 to 175 mPa·sec, the flexure is 14 mm or less and the cutting efficiency is satisfactory. In particular, while the viscosity of the slurry at 25° C. is in the range from 110 to 150 mPa·sec, the flexure is 8 mm or less and the cutting efficiency reaches a more desirable level. If the viscosity of the slurry is high, the sludge of the rare earth alloy is likely to be deposited within the cut grooves of the work. Accordingly, the cutting resistance increases whereas the cutting efficiency decreases. As a result, the flexure of the wire adversely increases. In view of these factors, the viscosity of the slurry at 25° C. is set preferably within the range from 92 to 175 mPa·sec, more preferably within the range from 110 to 150 mPa·sec.

Figure 9:
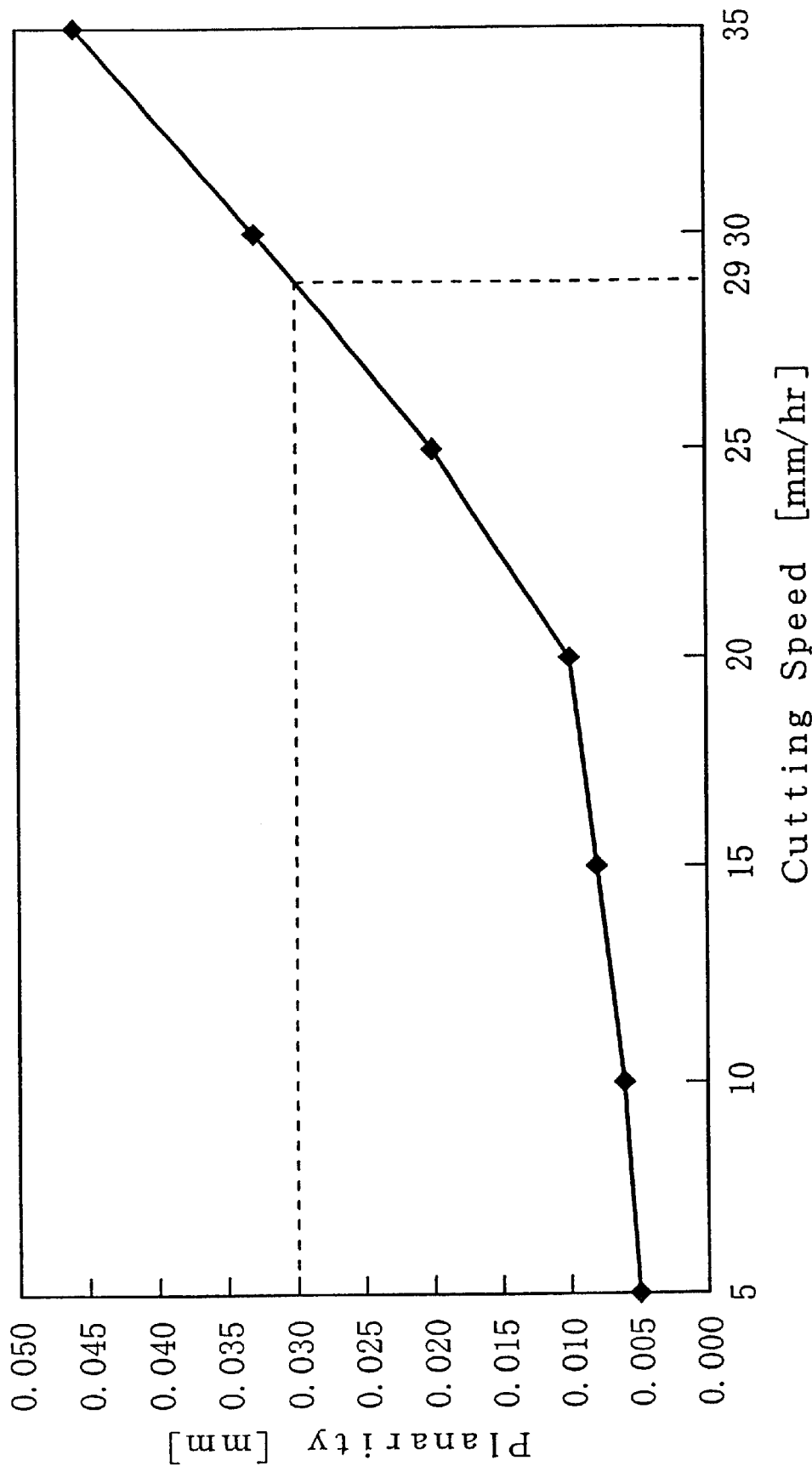
FIG. 9 is a graph illustrating the relationship between the work cutting speed and the planarity of a cut face of the work.

FIG. 9 illustrates the relationship between the work cutting speed and the planarity of a cut face of the work. The cutting speed corresponds to the lowering speed of the work or the work plate. As shown in FIG. 9, as the work cutting speed increases, the planarity of the cut face of the work deteriorates. If the planarity exceeds 0.030 mm, the work efficiency decreases as a whole in view of the time required for a subsequent polishing process step. Accordingly, the planarity is preferably 0.030 mm or less, and the work cutting speed is preferably adjusted such that the planarity of the machined face becomes 0.030 mm or less. Consequently, in this embodiment, the work cutting speed is preferably set at 29 mm/hr or less.

Figure 10:
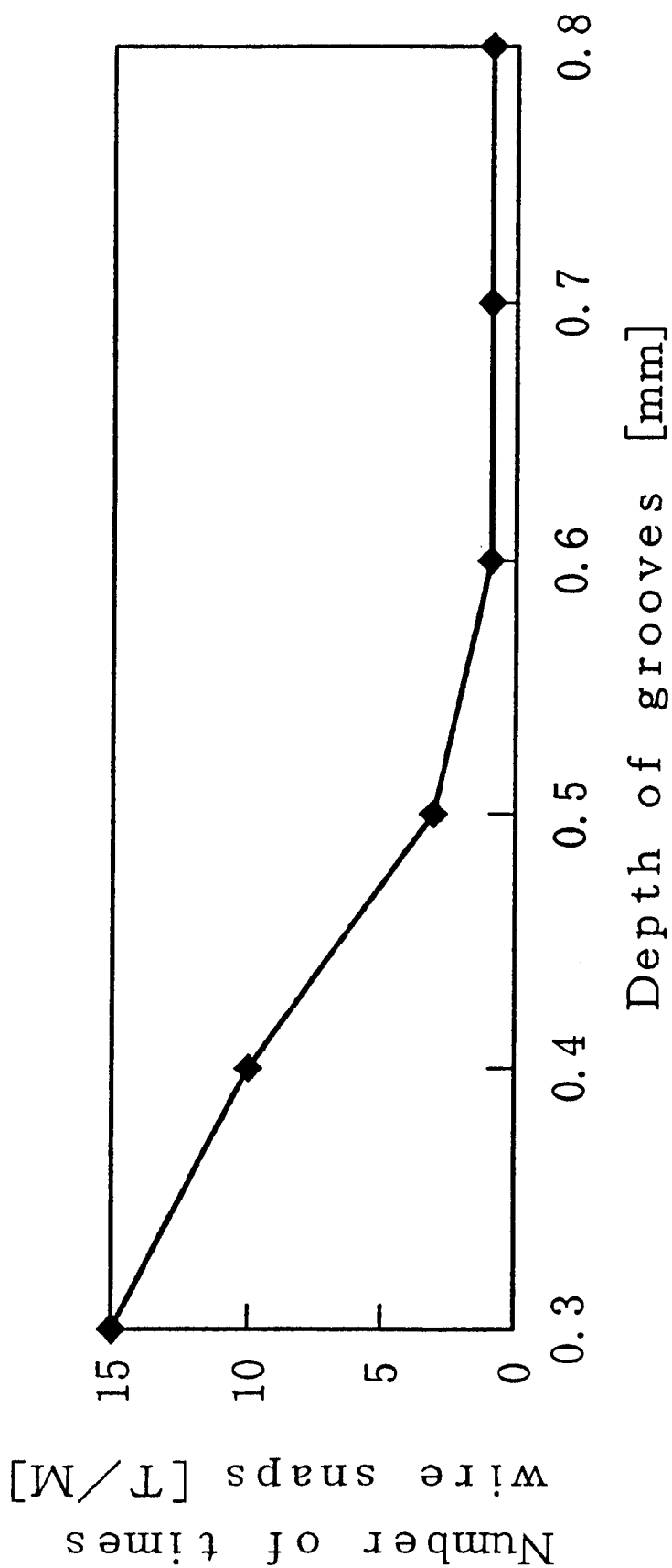
FIG. 10 is a graph illustrating the relationship between the depth of grooves of a main roller and the number of times the wire snaps.

FIG. 10 illustrates the relationship between the depth of grooves of a main roller and the number of times the wire snaps, measured in times per month (T/M). As shown in FIG. 10, if the depth of the grooves is 0.3 mm or more, the number of times a wire snaps decreases. If the depth of the grooves of a main roller is 0.5 mm or more, the possibility of wire snapping is considerably lower. And if the depth of the grooves is 0.6 mm or more, snapping rarely occurs. Accordingly, the depth of the grooves needs to be 0.3 mm or more in practice and is preferably 0.5 mm or more, more preferably 0.6 mm or more. Though not shown in FIG. 10, if the depth of the grooves is less than 0.3 mm, the wire snaps 15 times or more a month.

Figure 11:
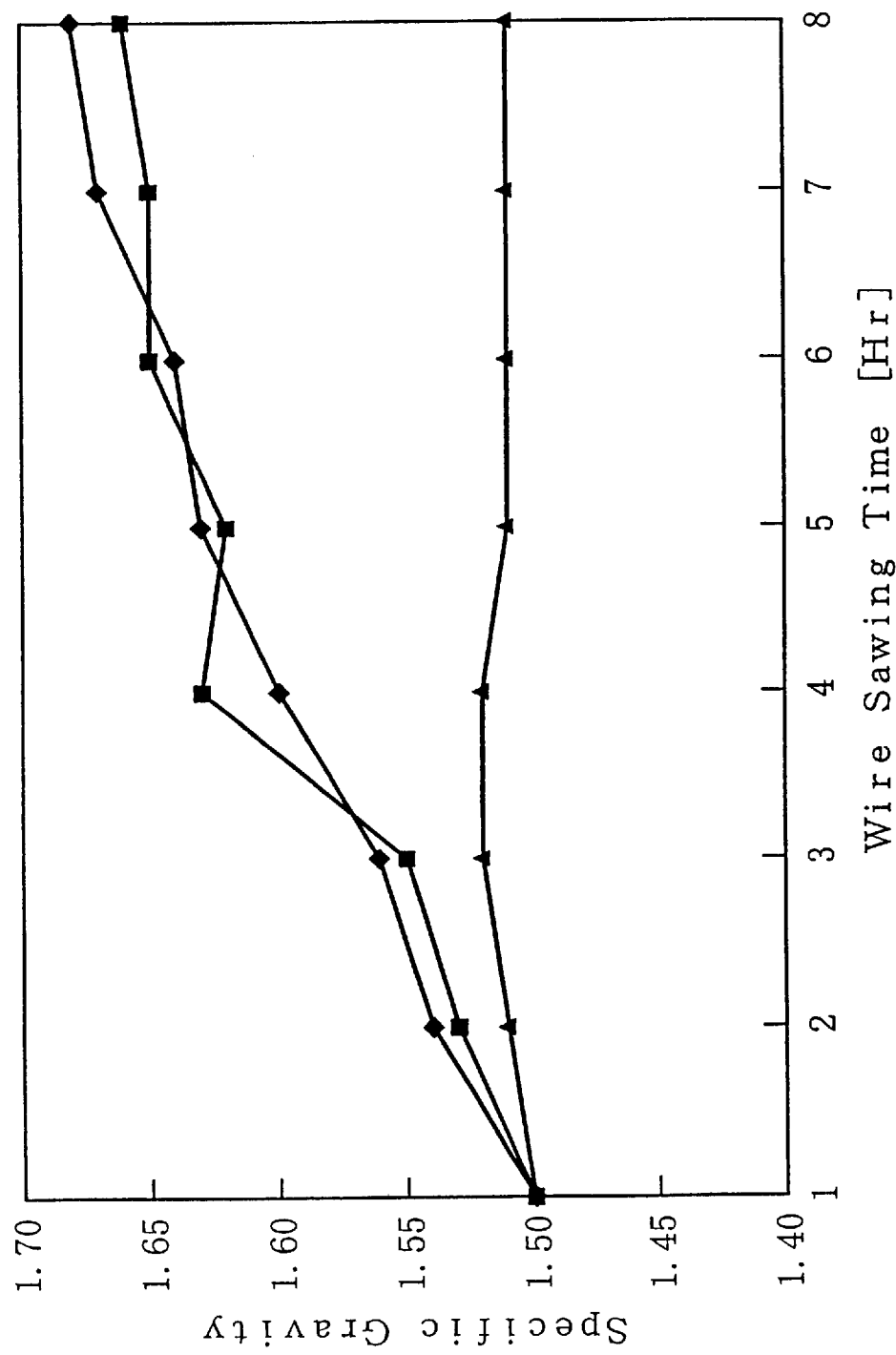
FIG. 11 is a graph illustrating the change in specific gravity of slurry over time while sawing for three strengths of magnetic field in the magnetic separator.

FIG. 11 is a graph illustrating the change in specific gravity of slurry over time while sawing for three strengths of magnetic field in the magnetic separator. It is known that the higher the concentration of the rare earth alloy sludge in the slurry, the larger the specific gravity of the slurry is. In view of this phenomenon, the present inventors analyzed how the concentration of the sludge increases with the operation time of the machine. In FIG. 11, data about the following three cases are illustrated. Namely, a case where the magnetic separator is not used is identified with ■; a case where a magnetic separator applying a magnetic field of 0.1 tesla at the surface of the drum is used is identified with ♦; and a case where a magnetic separator applying a magnetic field of 0.3 tesla at the surface of the drum is used is identified with ▲. The viscosity of the slurry used in this experiment is 110 mPa·sec at 25° C. As can be seen from FIG. 11, if the magnetic field applied at the surface of the drum is 0.3 tesla, the specific gravity of the slurry is kept at a substantially constant level of about 1.5. This means that the sludge has been sufficiently separated and collected and therefore a long-duration continuous operation can be performed without totally replacing the slurry. It is noted that if the magnetic field is less than 0.1 tesla, the wire snaps after the machining has been performed for four hours, which is the same effect noted in the case of not using the magnetic separator.

Figure 12:
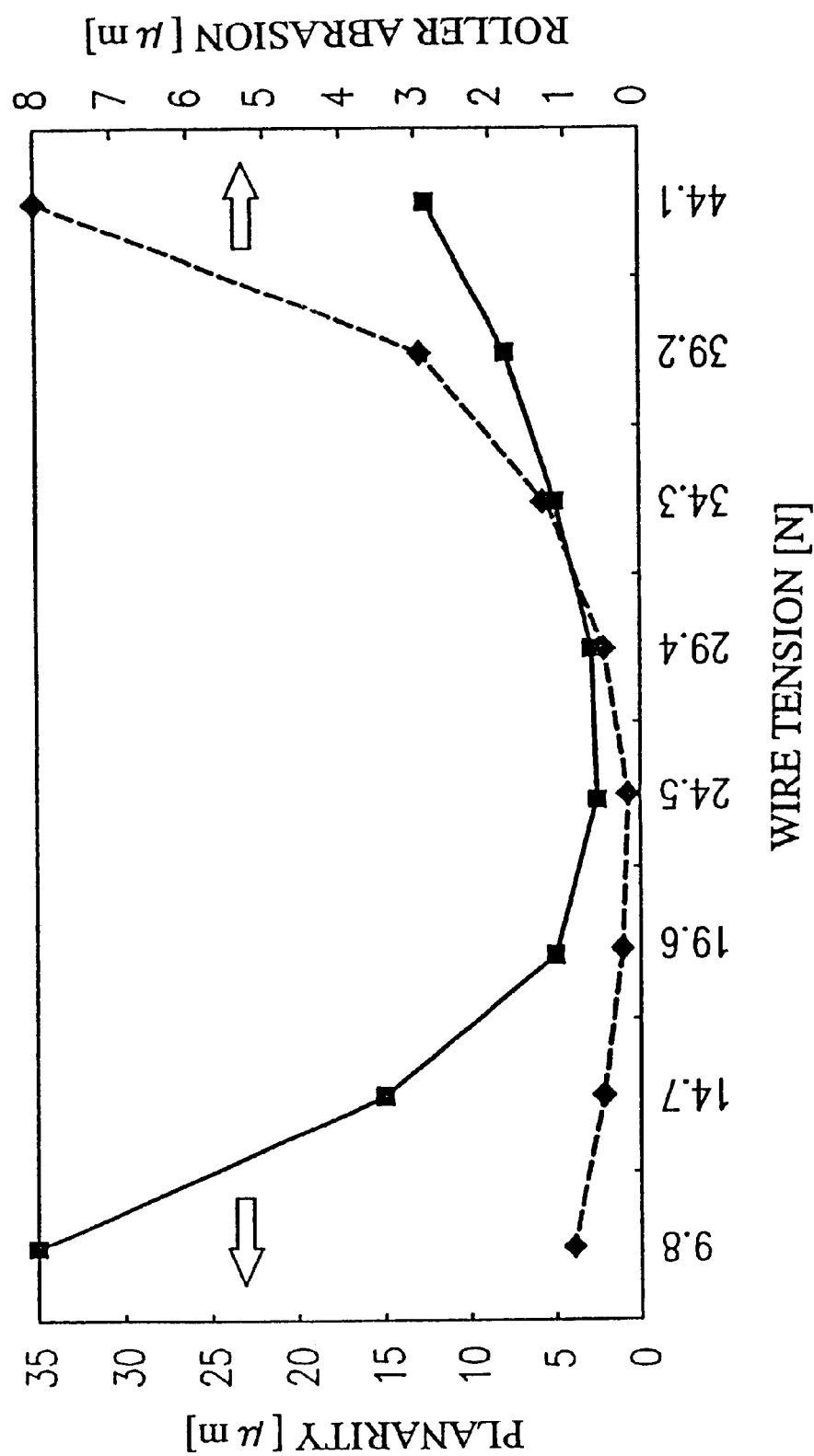
FIG. 12 is a graph illustrating how the wave (planarity) of the work and the roller abrasion depend on the tension of the wire.

FIG. 12 is a graph illustrating how the wave (planarity) of a work cut face and the roller abrasion depend on the wire tension. In FIG. 12, the solid line connecting "■" marks represents the planarity of a work cut face versus wire tension, and the dashed line connecting "♦" marks represents the roller abrasion versus wire tension. The left-side y axis represents the planarity of a work cut face, while the right-side y axis represents the roller abrasion. The smaller the value of the "planarity" is, the smaller the degree of the wave of the cut face is. The "roller abrasion" as used herein refers to the abrasion of the outer circumference of the roller (the face of the roller coming in contact with the wire) caused when the wire abrades the bottom of the V-shaped groove of the roller resulting in forming a Y-shaped deep groove in cross section. In this graph, the degree of the roller abrasion is represented by the depth of a groove newly formed further deep from the bottom of the V-shaped groove during a predetermined time period. The details of the data graphed in FIG. 12 are shown in

TABLE 1

| Wire tension (N) | Work planarity (μm) | Roller abrasion (μm) |
|---|---|---|
| 9.8 | 35 | 1 |
| 14.7 | 15 | 0.5 |
| 19.6 | 5 | 0.2 |
| 24.5 | 2 | 0.1 |
| 29.4 | 3 | 0.5 |
| 34.3 | 5 | 1.2 |
| 39.2 | 8 | 3 |
| 44.1 | 13 | 8 |

In the experiment, slurry having a viscosity at 25° C. of about 100 mPa·sec was supplied to the wire running in one direction at a speed of 640 m/min. The core diameter of the wire was 0.18 mm ø. The rollers used had a diameter of 170 mm, and the surface portion (wire contact face) thereof was made of ester-type urethane rubber. The V-shaped grooves formed on the roller surface portion of each roller had a depth of 0.3 mm and a width of 0.2 mm. The work was pressed against the wire under a constant-pressure load for cutting. The abrasive grains dispersed in the slurry were made of SiC with a mean grain size of 20 to 28 μm. The weight ratio of oil (i.e., dispersion medium) to abrasive grains in the slurry was 1:1.1 (oil: abrasive grains).

In the experiment, a wire saw machine (MWM-444) of NIPPEI TOYAMA Co., Ltd. was used. The wire was given tension by a permanent weight W and wound around the rollers. The tension of the wire was measured with a load cell disposed at a shaft of a guide roller that guides the wire between the main roller 34c and a wire holding portion.

As can be seen in FIG. 12, as the wire tension is increased, the planarity of the work cut face improves, while the roller abrasion increases. As the roller abrasion increases, stronger resistance is applied to the wire due to a Y-shaped deep groove formed on the surface of the roller, and as a result, the wire is more likely to snap. The roller abrasion first occurs when the wire slips with respect to the roller and develops. According to the experiment, continuous cutting operation becomes significantly difficult when the roller abrasion exceeds 4 μm. In view of this, the wire tension is preferably set at 39.2N or less.

If the wire tension is made excessively small, the planarity of the work cut face exceeds 20 μm. With this level of planarity, it is difficult to use the resultant magnet for a voice coil motor and the like. In view of this, the wire tension is preferably set at 14.7N or more.

From the above experimental results, it is found that, in the cutting of a rigid, somewhat viscous rare earth alloy such as a R—T—(M)—B type sintered magnet (where R is a rare earth element including Y, T is Fe or a mixture of Fe and Co, M is an additive element, and B is boron), the wire tension is preferably adjusted to fall in the range between 14.7N and 39.2N. If it is desired to further improve the planarity of the work cut face and further suppress the roller abrasion, the wire tension is more preferably in the range between 19.6N and 34.3N.

Accuracy of the cutting was evaluated for the cases where the slurry was subjected to and was not subjected to temperature control. When no temperature control was performed, the temperature of the slurry rose as the continuous operation proceeded, to finally reach as high as 60° C. With the temperature rise, the viscosity of the slurry fell outside the preferable range. This lowered the grindability of the abrasive grains against the object to be machined, and also lowered the discharge efficiency of sludge. Moreover, this reduced the attachment of the abrasive grains to the wire, that is, reduced the amount of abrasive grains residing on the wire. For these reasons, the flexure of the wire increased to as large as about 15 mm. Therefore, the planarity of the work cut face and thus the parallelism of cut pieces from the work reduced. If the temperature of the slurry further rises, the flexure of the wire will even more increase, presumably resulting in markedly lowering the cutting accuracy.

On the contrary, when the temperature of the slurry was controlled at about 30° C. using the temperature sensor and the cooling device described above, the flexure of the wire did not increase widely, only varying within the small range from 5 to 10 mm. As a result, the planarity of the work cut face was satisfactory and high cutting accuracy was maintained for a prolonged period of time.

The above evaluation of the cutting accuracy depending on whether or not temperature control was performed was carried out under basically the same conditions as those described above in relation with the experiment for obtaining the graph shown in FIG. 12. In the experiment for the evaluation of the cutting accuracy, the wire tension was 24.5N and the work lowering speed was 0.3 mm/min. In this experiment, the temperature of the slurry was detected somewhere in the second circulating pipe 46, seen in FIG. 5. From the experimental results described above, it is found that the cutting accuracy may possibly be lowered during continuous operation if the slurry is not subjected to temperature control even though the viscosity of the slurry at room temperature is within a proper viscosity range and sludge of a rare earth alloy is well removed from the slurry with the magnetic separator.

Referring back to FIG. 1, the rare earth alloy plates formed by cutting in the manner described above are finished by grinding for adjustment of the size and shape. Thereafter, in Step S8, the rare earth alloy plates are subjected to surface treatment for improvement in long-term reliability. In Step S9, magnetizing is performed. Thus, after passing through a testing process, a neodymium permanent magnet is completed.

As described above, according to the method for cutting a rare earth alloy of the present invention, the planarity of a cut face improves and the roller abrasion is suppressed even in the case where the work of a rare earth alloy to be cut has a large cutting resistance and sludge produced from the rare earth alloy easily aggregates. As a result, continuous operation of the wire saw is possible, and high production yield is achieved.

In the above embodiment, an Nd—Fe—B rare earth alloy magnet material was used as the object to be machined. The reason is as follows. An R—T—(M)—B type sintered magnet (where R is a rare earth element including Y, T is Fe or a mixture of Fe and Co, M is an additive element, and B is boron), such as an Nd—Fe—B sintered magnet, includes a rigid tetragonal $R_2T_{14}B$ compound and a viscous rare earth rich phase. Cutting of this material is especially difficult. It was therefore expected that this material would exhibit the beneficial effects of the present invention most significantly. Other rare earth alloys also have the properties described above that the cutting resistance is large and that sludge thereof easily aggregates. It should therefore be understood that substantially the same effects as those described in the above embodiment are also obtained if any of other rare earth alloys is used as the object to be machined.

When the rare earth magnets are manufactured in accordance with the above-described method, the cutting width is smaller compared with the case of cutting an ingot of a rare earth alloy using a slicing blade. Accordingly, the method of the present invention is suitable for manufacturing thinner magnets (having a thickness of 0.5 to 3.0 mm, for example). Recently, the thickness of a rare earth magnet used for a voice coil motor has been increasingly smaller. If such a thin rare earth magnet manufactured by the method of the present invention is attached to a voice coil motor, a high-performance downsized voice coil motor can be provided.

According to the present invention, in the cutting of a rare earth alloy with a wire saw, wire snapping is prevented, the trouble of roller abrasion is solved, and furthermore, the machine can be operated continuously for a much longer period of time.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for cutting a rare earth alloy comprising the steps of: cutting an R—Fe—B rare earth sintered magnet to be machined, where R is a rare earth element, using a cutting wire while supplying a slurry comprising dispersed abrasive grains between said cutting wire and said R—Fe—B rare earth sintered magnet, wherein the R—Fe—B rare earth sintered magnet is cut while being lowered from a position above said wire to a position below said wire, wherein said wire is driven with a drive member, at least a wire contact face of said drive member being composed of an organic polymer material, wherein said viscosity of said slurry at 25° C. is in range from 92 to 175 mPa·sec, and wherein said cutting is carried out while a tension in a range between 14.7N and 39.2N is applied to said wire.

2. The method according to claim 1, wherein R includes the rare earth element Y.

3. The method according to any one of claim 1, wherein said rare earth alloy is divided into a plurality of blocks that are secured together, and at least part of said slurry is supplied through gaps between said blocks.

4. The method according to any one of claim 1, wherein means for supplying said slurry to said wire is disposed at a position upstream of a wire running direction with respect to the object to be machined.

5. The method according to any one of claim 1, wherein a slurry supply aperture supplies slurry to said wire at a position upstream of a wire running direction with respect to the object to be machined.

6. The method according to any one of claim 1, wherein said drive member is a roller made of ester-type urethane rubber.

7. A method for manufacturing rare earth alloy plates, comprising the steps of:

producing an ingot of a rare earth alloy and separating a plurality of rare earth alloy plates from the ingot using the method for cutting a rare earth alloy according to either claim 1.

8. A method for manufacturing rare earth magnets comprising the steps of:

producing a rare earth magnet by compacting and sintering rare earth alloy powder; and separating a plurality of magnets from said rare earth magnet by the method for cutting a rare earth alloy according to either claim 1.

9. A voice coil motor comprising the rare earth magnet manufactured by the method according to claim 8.

10. A voice coil motor according to claim 9, wherein the thickness of the rare earth magnet is in a range from 0.5 to 3.0 mm.

11. A method for cutting a rare earth alloy comprising the steps of: cutting an R—Fe—B rare earth sintered magnet to be machined, where R is a rare earth element, using a cutting wire while supplying a slurry comprising dispersed abrasive grains between said cutting wire and said R—Fe—B rare earth sintered magnet, wherein the R—Fe—B rare earth sintered magnet is cut while being lowered from a position above said wire to a position below said wire, wherein said wire is driven with a drive member, at least a wire contact face of said drive member being composed of a organic polymer material, wherein the viscosity of said slurry at 25° C. is in a range from 92 to 175 mPa·sec, and wherein the temperature of said slurry is controlled to fall within a predetermined range.

12. The method according to claim 11, further comprising the steps of:

collecting said slurry containing sludge produced during said cutting of said object to remove the sludge from said slurry; and performing temperature control for said slurry from which said sludge is removed.

13. The method according to claim 11, wherein R includes the rare earth element Y.

14. The method according to any one of claim 11, wherein sludge is collected from said slurry with a magnetic separator.

15. The method according to claim 14, wherein said magnetic separator generates a magnetic field of at least 0.3 tesla in a region where the sludge is collected.

16. An apparatus for cutting a rare earth alloy, wherein an R—Fe—B rare earth sintered magnet to be machined is cut with a cutting wire while slurry containing dispersed abrasive grains is supplied between said wire and said R—Fe—B rare earth sintered magnet, the apparatus comprising:
- means for supplying said slurry of a viscosity at 25° C. in a range from 92 to 175 mPa·sec between said wire and said R—Fe—B rare earth sintered magnet;
- means for lowering the R—Fe—B rare sintered magnet from a position above said wire to a position below said wire;
- a drive member for driving said wire, at least a wire contact face of said drive member being composed of an ester-type urethane rubber; and
- means for applying to said wire a tension in a range between 14.7 N and 39.2 N.

17. An apparatus for cutting a rare earth alloy, wherein an R—Fe—B rare earth sintered magnet to be machined is cut with a cutting wire while slurry containing dispersed abrasive grains is supplied between said wire and said R—Fe—B rare earth sintered magnet, the apparatus comprising:
- means for supplying said slurry of a viscosity at 25 °C. in a range from 92 to 175 mPa sec between said wire and said object;
- means for lowering the R—Fe—B rare earth sintered magnet from a position above said wire to a position below said wire;
- a drive member for driving said wire, at least a wire contact face of said drive member being composed of an ester-type urethane rubber;
- a temperature detector for detecting the temperature of said slurry; and
- a cooling device for cooling said slurry to control the temperature of said slurry to fall within a predetermined range.

18. The apparatus according to claim 17, further comprising means for heating said slurry.

19. The apparatus according to any one of claims 16 to 18, further comprising a magnetic separator for separating sludge of the rare earth alloy produced during said cutting of the rare earth alloy from said slurry by use of a magnetic field.

20. The apparatus according to claim 19, wherein said magnetic separator generate a magnetic field of at least 0.3 tesla in a region where the sludge is collected.

21. An apparatus for cutting a rare earth alloy, wherein an R—Fe—B rare eart sintered magnet to be machined is cut with a cutting wire while slurry containing dispersed abrasive grains is supplied between said wire and said R—Fe—B rare earth sintered magnet, the apparatus comprising:
- at least one slurry supply aperture for supplying said slurry of a viscosity at 25° C. in a range from 92 to 175 mPa·sec between said wire and said R—Fe—B rare earth sintered magnet;
- means for lowering the R—Fe—B rare earth sintered magnet from a position above said wire to a position below said wire;
- a drive member for driving said wire, at least a wire contact face of said drive member being composed of an ester-type urethane rubber; and
- a wire tensioner for applying to said wire a tension in a range between 14.7 N and 39.2 N.

22. An apparatus for cutting a rare earth alloy wherein an R—Fe—B rare earth sintered magnet to be machined is cut with a cutting wire while slurry containing dispersed abrasive grains is supplied between said wire and said R—Fe—B rare earth sintered magnet, the apparatus comprising:
- at least one slurry supply aperture for supplying slurry of a viscosity at 25° C. in a range from 92 to 175 mPa·sec between said wire and said R—Fe—B rare earth sintered magnet;
- means for lowering the R—Fe—B rare earth sintered magnet from a position above said wire to a position below said wire;
- a drive member for driving said wire, at least a wire contact face of said drive member being composed of an ester-type urethane rubber;
- a temperature detector for detecting the temperature of said slurry; and
- a cooling device for cooling said slurry to control the temperature of said slurry to fall within a predetermined range.

23. The apparatus according to claim 22, further comprising a slurry heater.

24. The apparatus according to any one of claims 22, further comprising a magnetic separator for separating sludge of the rare earth alloy produced during said cutting of the rare earth alloy from said slurry by use of a magnetic field.

25. The apparatus according to claim 24, wherein said magnetic separator generates a magnetic field of at least 0.3 tesla in a region where the sludge is collected.

* * * * *